Aug. 12, 1924.  
D. HINDAHL  
DUMP CAR  
Filed Feb. 11, 1922  
1,504,239  
3 Sheets-Sheet 1
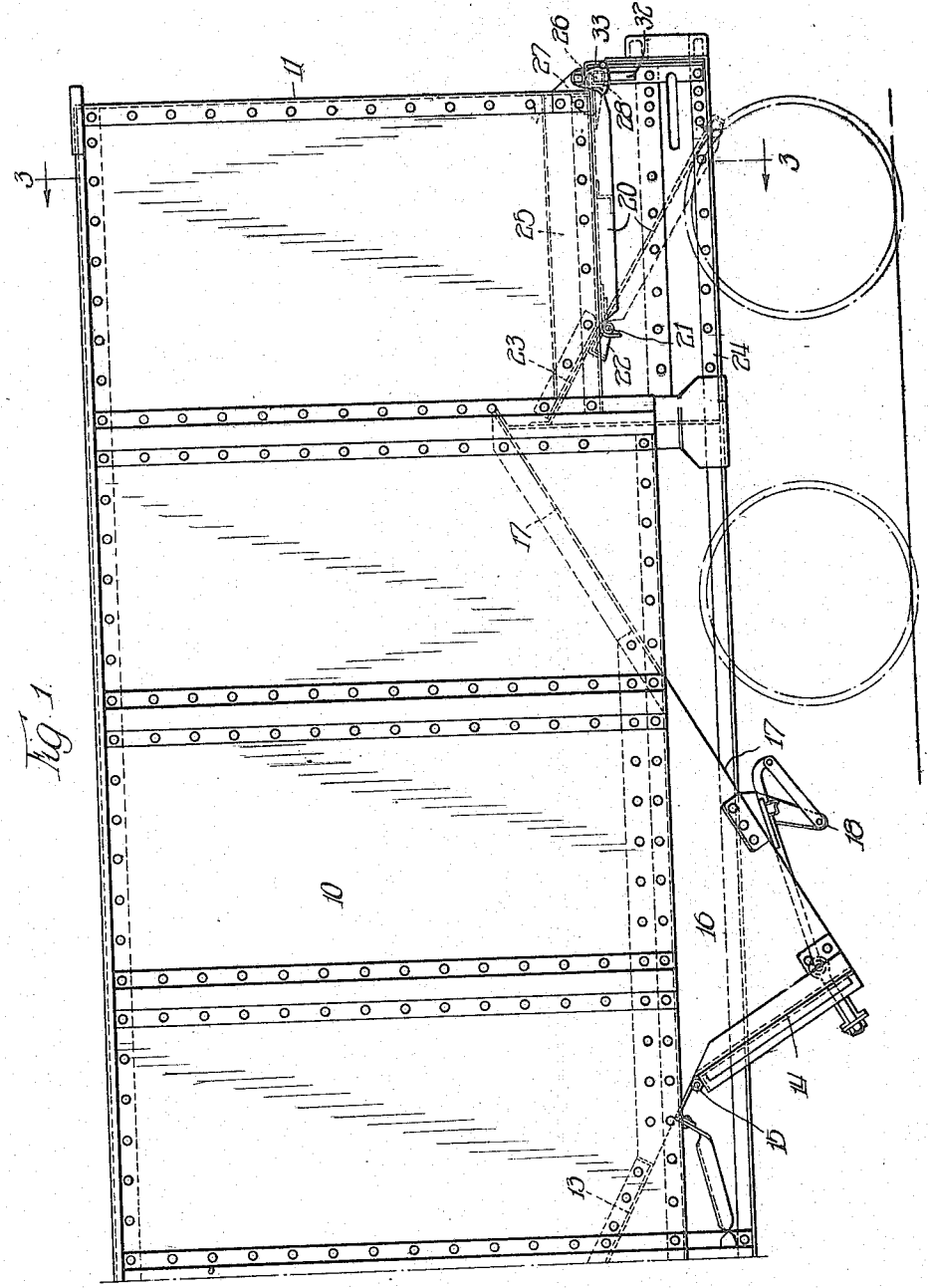
Witness:
R. Burkhardt.
Inventor:
David Hindahl
By Wilkinson, Huxley, Byron & Knight
attys.

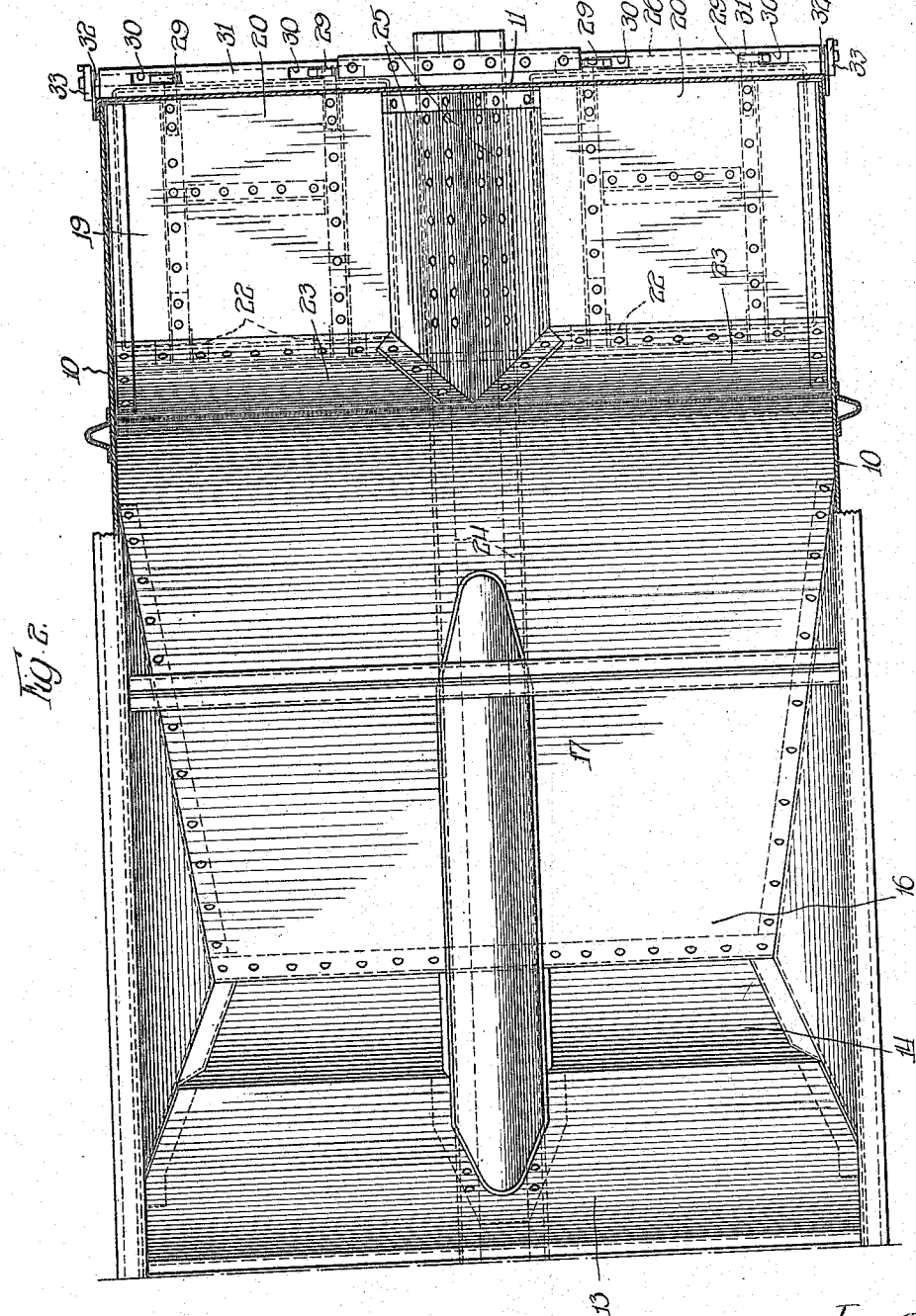

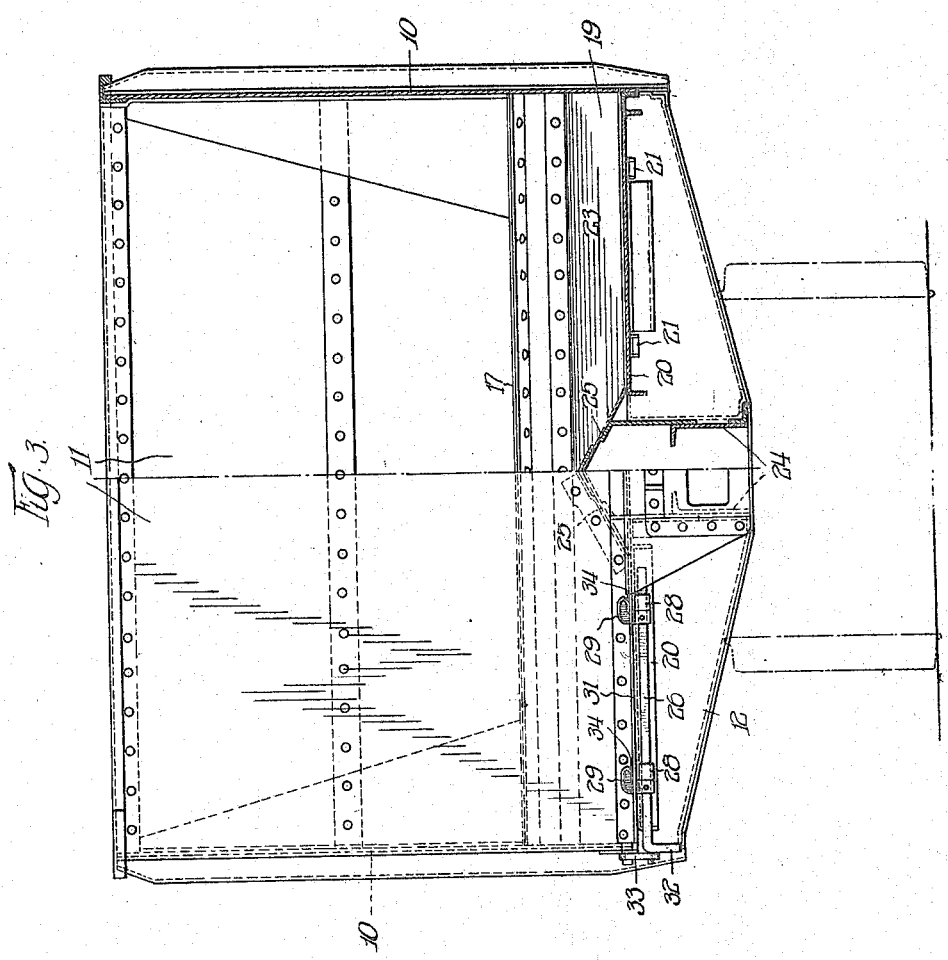

Patented Aug. 12, 1924.

1,504,239

UNITED STATES PATENT OFFICE.

DAVID HINDAHL, OF CHICAGO, ILLINOIS, ASSIGNOR TO HARRY S. HART, OF CHICAGO, ILLINOIS.

DUMP CAR.

Application filed February 11, 1922. Serial No. 535,923.

*To all whom it may concern:*

Be it known that I, DAVID HINDAHL, a citizen of the United States, residing at Chicago, in the county of Cook and State of Illinois, have invented certain new and useful Improvements in Dump Cars, of which the following is a specification.

This invention relates to dump cars.

One object of the invention is to improve dump car constructions in a novel and simple manner to increase the capacity thereof and at the same time retain the self-cleaning feature and maintain required clearances.

Another object is to provide simple and efficient door operating mechanism whereby certain of the dump doors may be readily locked and unlocked in a manner to meet the requirements for successful commercial operation.

These and other objects are accomplished by means of the arrangement disclosed by the accompanying sheets of drawings, in which:

Figure 1 is a fragmentary longitudinal side elevation of a dump car embodying my invention;

Figure 2 is a fragmentary top plan view of the same car; and

Figure 3 is a fragmentary partial end elevation and partial section of the dump car, the section being taken in the plane of line 3—3 of Figure 1.

The various novel features of the invention will be apparent from the following description and drawings, and will be particularly pointed out in the appended claims.

In recent years the importance of increasing the carrying capacity of railway cars has become recognized, this being especially true in connection with dump cars for carrying coal and other dumpable materials. In a certain well known type of dump car, the floor at each end of the car over the trucks includes a long sloping member extending downwardly from the end of the car near the top thereof toward the transverse center of the car to form one wall of a transversely extending pocket, the center of the car being provided with a transversely A-shaped portion including transversely arranged dump doors forming the other wall for each of these hoppers arranged on either side of the transverse center line of the car. In order words, this well known type of dump car includes two transversely arranged hoppers, the walls of which are formed by a transversely extending A-shaped portion in the middle of the car end with long sloping members at the ends of the car, said members extending downwardly and toward the transverse center of the car.

By referring to the figures of the drawings, it will be noted that I have disclosed my invention in connection with a dump car including sides 10 and ends 11, and a floor, the structure of which is different on opposite sides of the bolsters 12. The floor construction intermediate the bolsters 12 includes a transversely arranged A-shaped portion, the upper part 13 of which is stationary and the lower part of which at each side of the A includes a transversely arranged dump door 14 transversely pivotally hung at 15. This transversely arranged A-shaped portion including the members 13 and doors 14 divides the car into two hoppers 16 only one of which is shown in the figures of the drawings. In the case of each of these transversely arranged hoppers 16 one wall is formed by the transversely arranged members 13 and 14, the other transversely arranged wall being formed by a sloping member 17 which extends substantially from the inner end of the floor portion over the trucks and from the bolster 12 downwardly toward the transverse center of the car. The exit opening at the lower end of the member 17 normally is closed by the transversely arranged dump door 14, which, when closed, forms a tight seal with the lower edge of the member 17. It will be understood that the dump doors 14 forming portions of the transverse central A-shaped structure swing inwardly toward each other when moved into open position and outwardly away from each other when moved into closed position. These transverse dump doors 14 may be operated by any usual operating mechanism 18.

The floor portions over the trucks at each end of the car preferably take the form of two longitudinally extending hoppers 19, the lower portion of each of which is formed by a longitudinally extending horizontally mounted door 20, the outer edges of which extend to the end of the car body and the inner portion of each of which is pivotally connected at 21 to a transversely extending frame member 22. This transversely extending frame member 22 is secured to the lower end of a transversely extending shedding frame member 23 which is arranged in a sloping position and extends downwardly toward the end of the car from the bolster 12, said shedding portion also extending from the side of the car toward the center thereof in each case. The center sill structure 24 includes downwardly and outwardly sloping shedding portions 25, the shedding portions 25 and 23 sloping downwardly toward the door 20 in each case and forming walls of the hoppers 19. By thus having the doors 20 located below the top of the center sill structure the carrying capacity of the car, and especially of the end portions of the car, is greatly increased and at the same time the shedding portions 23 and 25 make the car at the ends thereof self-cleaning. As shown in dotted lines in Figure 1, one of the dump doors 20 is open for permitting the material at the end of the car to flow downwardly and outwardly longitudinally with respect to the length of the car for dumping such material intermediate the rails, and it will be understood that the remaining portion of the load is dumped by a downwardly and inwardly longitudinal movement with respect to the car. In other words, the flow of the dumpable material is divided over the bolsters 12, part of the material sliding longitudinally inwardly toward the transverse center of the car and the remaining part flowing downwardly and outwardly from the center of the car and more particularly from the bolster toward the end of the car, and all of such dumpable material being discharged longitudinally of the car.

Normally each of the dump doors 20 is held in closed position by means of locking mechanism including a shaft 26 which is carried at the outer extremity of the associated door 20 by a plurality of brackets 27 secured at the door, said brackets having squared looped portions 28 in which the squared shaft 26 may be moved transversely with respect to the car. Secured to each of the shafts 26 are a plurality of hook members 29 which extend vertically upwardly from the shaft 26 and when the door is in its normal locked position extend through slots 30 in an end frame member 31 of the car. When the doors are in locked position, as shown in Figures 2 and 3, the hook members 29 extend beyond the slots 30 and hook over rigid portions of the end frame member 31 for locking the associated door in closed position. To unlock one of the doors it is then only necessary to apply force in an outward direction upon the downwardly extending projection 32 at the outward end of the shaft 26. In this connection it will be noted that the hooks 29 are tapered as at 34 to facilitate opening the associated dump door, when the locking shaft 26 has been moved a predetermined distance in an outward direction. When it is desired to close and lock the dump doors it is merely necessary to raise the same, pass the hooks 29 through the slots 30 and then push the shaft 26 inwardly until the hooks 29 move into a locking position. The shaft 26 normally is held in locking position by a member 33 pivotally connected to the side of the car and overlapping a portion of the end of the shaft.

By constructing the dump car in the manner described, the capacity of the car is effectively increased and at the same time the self-cleaning feature is maintained.

It is my intention to cover all modifications of the invention falling within the spirit and scope of the following claims.

I claim:

1. A dump car having sides, ends and a floor, a center sill structure rising into the floor over the trucks and forming shedding portions, and dump doors on each side of said shedding portions hinged at or near the bolster and extending toward the end of the car for dumping the load over the trucks downwardly and longitudinally with respect to the car.

2. A dump car having sides, ends and a floor, the floor portions over the trucks having central downwardly and outwardly extending shedding portions and transversely arranged downwardly and longitudinally extending shedding portions, and dump doors hinged at or near the bolster and extending from the bolster toward the end of the car for dumping the load over the trucks downwardly and longitudinally with respect to the car.

3. A dump car having sides, ends and a floor, the floor portions over the trucks having central downwardly and outwardly sloping portions and transversely extending downwardly and longitudinally sloping portions, and a dump door extending between the end of the car and the bolster associated with said sloping portions whereby the load may be dumped downwardly and longitudinally with respect to the car.

4. A dump car having sides, ends and a floor, the floor portion over the trucks between the end of the car and the bolster comprising doors on each side of the center sill hinged at or near the bolster and arranged to dump the load longitudinally of the car and toward the end thereof.

5. A dump car having sides, ends, and a floor, the floor portion between the trucks being generally at a lower level than the floor portion over the trucks, the floor portion over the trucks and between the end of the car and the bolster comprising doors on each side of the center sill, hinged transversely of the car at or near the bolster and dropping downwardly from the end of the car.

6. A dump car having sides, ends, and a floor, the floor portion between the trucks being generally at a lower level than the floor portion over the trucks, the floor portion over the trucks and between the end of the car and the bolster including doors on each side of the center sill hinged transversely of the car at or near the bolster.

Signed at Chicago, Illinois, this 8th day of February, 1922.

DAVID HINDAHL.